US005548289A

United States Patent [19]

Chekroun et al.

[11] Patent Number: 5,548,289

[45] Date of Patent: Aug. 20, 1996

[54] ANTI-SENSING METHOD AND DEVICE FOR RADAR

[75] Inventors: Claude Chekroun, Bures Sur Yvette; Henri Sadones, Paris, both of France

[73] Assignee: Contre Mesure Hyperfrequence C M H, Les Ulis, France

[21] Appl. No.: 623,290

[22] Filed: Apr. 26, 1984

[30] Foreign Application Priority Data

May 6, 1983 [FR] France .................................. 83 07580

[51] Int. Cl.[6] ..................................................... G01S 7/495

[52] U.S. Cl. ................................................................ 342/16

[58] Field of Search .................................. 343/18 E, 872; 342/16

*Primary Examiner*—Daniel T. Pihulic

*Attorney, Agent, or Firm*—Pollock, Vande Sande & Priddy

[57] ABSTRACT

In a radar, a protective radome is placed in front of a to-be-protected antenna. The antenna is made of several networks that are superimposed. At least one of the active networks can be controlled electrically in two distinct states A or B. In state A, the radome, which is placed in front of the antenna, is transparent for the radar operation frequency band and reflective outside that band. For state B, the radome is reflective for all radar frequencies. The invention especially protects the radar against jammers that transmit outside the radar operation frequency band, while providing for the total camouflaging of the radar when it is not being used.

16 Claims, 1 Drawing Sheet

ANTI-SENSING METHOD AND DEVICE FOR RADAR

FIELD OF THE INVENTION

This invention pertains to an anti-jamming and anti-sensing method and device, for radar.

BACKGROUND OF THE INVENTION

The operation of radars, under some circumstances, can be deeply affected by natural and especially artifical jamming phenomena, for instance one or more jamming beams being sent to the radar, which "blind" the radar.

Also a radar antenna, especially when it is airborne, represents an especially visible and detectable target, particularly when viewed by an enemy pursuit aircraft.

In order to avoid or reduce the effects of the aforementioned jamming, various methods and means, like those described in the French patent 79 02918 filed on Feb. 5, 1979, were known. In this patent, means are described which make it possible to effectively eliminate the effects of one or more localized jammers, by artifically creating in the response curves of the radar "holes" that are localized in the direction of the jammers.

In order to meet the previously mentioned problems attempts to miniaturize and profile the radar antenna, so that is is detectable as little as possible by reducing its apparent surface.

The invention pertains to a new method and to a new device which allows for the radical resolution of the question of "camouflage" of the antenna and simultaneously, the protection of the antenna against any jamming effect within frequency ranges which are outside a narrow and accurate operating band of the radar antenna. Therefore, the invention can be used as an addition to the means which are described in the above-mentioned patent, use for which will make it possible to eliminate localized jammers which transmit inside a working frequency band of the antenna.

To be more accurate, in order to meet the goals which were set above, in front of the protected radar is placed a radome, which represents an active temporal space filter that includes at least two hyperfrequency networks, at least one of which is active and prone to adopt two distinctive states A and B, respectively. The networks are so assembled that, when the active network is in state A, the filter is fairly transparent for the operating frequency band of the radar and fairly reflective outside that band, and when the active network is in state B, the filter is reflective for all radar frequencies.

In this fashion, created in front of the radar is an active frequency window which, in the regular operating state of the radar, will allow only the working frequency band of the antenna to go through, and that, in the "camouflage" state of the antenna no wave frequency, which can be exploited by radar will be allowed through.

In order to obtain proper "camouflage" of the antenna in the second state the protective networks of the antenna have the shape of a convex curvature. The curvature shape may, for instance, be more or less spherical or ogival with a convexity turned towards the outer exploration zone of the radar, the protected radar being placed towards the center of the concavity of the protective radome that the shaped networks represent. In this manner, any hyperfrequency wave beam sent on the radar is reflected or scattered in all directions into space, the apparent surface of the radar only being a tiny point which is practically speaking invisible for the search radar, which scatters its hyperfrequency wave beam.

In terms of an active network as previously mentioned, a network comprising two sub-networks made of rows of wires or segments of conductive wire is preferably used. The wires are more or less parallel and locally directed according to an overall local direction X or Y. The wires are interrupted from interval to interval by controllable resistor elements, which are variable, especially like diodes. The network, for frequencies included within the operating frequency band of the radar, is fairly reflective when the currents which cross through the wires are more or less null, and transparent when said currents are significant. Advantageously, there is associated to one sub-network of locally directed diode wires according to the overall direction X an equivalent sub-network of locally directed diode wires according to a fairly orthogonal direction Y, in order to constitute a network of grid mesh, and the pitch of the sub-networks of wires is preferably selected roughly equal $\lambda/2$, $\lambda$ being the average wave length of the working frequency band of the antenna.

Other characteristics, objects and advantages of the invention will be more apparent with the description that follows in reference to the attached drawings which are only provided as illustration in which:

FIG. 1 is a schematic view which makes it possible to explain the general operating principle of the invention, FIG. 2 displays schematically how three networks are associated in order to form the active temporal space filter of the invention, FIG. 3 is a curve which illustrates the "transparency" of the active window that is formed according to the frequency of the hyperfrequency waves, FIG. 4 schematically displays in a perspective view how the networks are shaped and piled in order to form the protective radome in conformity with the invention, FIG. 5 schematically displays the assembly of three networks, two passive and one active which can be used to form the protective radome of an antenna.

DETAILED DESCRIPTION OF THE PRESENT INVENTION

Figure 1:
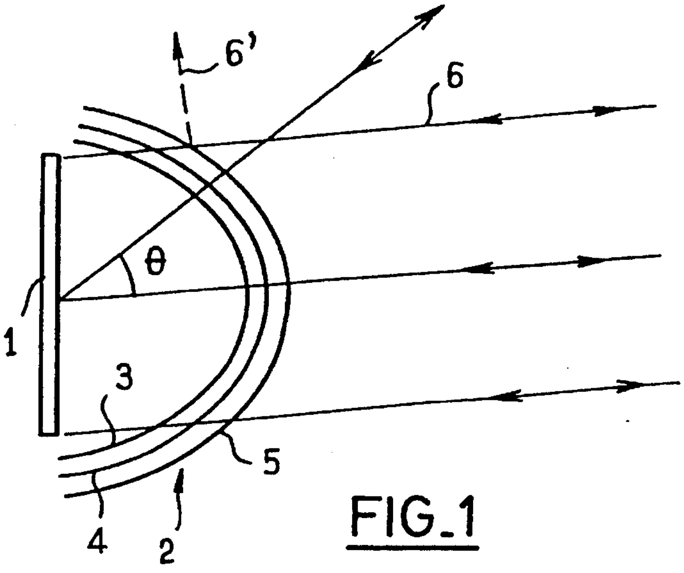

By first referring to FIG. 1, a radar transmission antenna which is schematized in 1. A ray transmitted to the antenna can be reflected at an angle $\Theta$. This antenna can be of the electronic and/or mechanical sweep type.

The antenna is substantially protected and surrounded in front by a panel 2. This panel forms the protective radome of the invention which is basically comprised of the superimposition of three networks 3, 4, 5 of which the make-up, the shape and the assembly will be described later.

As mentioned earlier, the radome 2 can be electronically controlled so as to display two different states A and B respectively.

In state A, which is the "normal work" state of the antenna, the radome 2 allows quite freely the hyperfrequency waves to cross without distortion or attenuation, but only inside a "window" with a f1–f2 frequency, as described later in more detail according to FIG. 3. In this state A, inside the working frequency band of the antenna, the radome 2 is somewhat "transparent" and its presence has no influence on the operation of the antenna, nor on transmission, nor on reception or re-transmission through reflection. In other words, everything happens as if the radome 2 did not exist.

On the other hand, outside the f1–f2 frequency band of the antenna, the radome 2 is highly reflective, therefore acting as an effective frequency filter. The transmission-reception function of the antenna has no effect, to the extent that the power of the beam which is transmitted outside the working f1–f2 frequency band is extremely low. On the other hand, upon reception of any radiation sent to the antenna, for instance ray 6, which has a frequency outside of f1–f2 the radiation is reflected, as shown by ray 6', at the surface of the radome 5. In view of the convexity which is assigned to the radome, the reflected ray 6' is not sent back in the direction of ray 6 but, rather, far away from that direction, so that it would seem that the beam sent by a search radar against the radome 5 will not produce any visible echo for the search radar if the search radar frequency is outside the actual frequency f1–f2 window.

From the preceding explanations, it seems that according to the invention, an efficient anti-sensing means for any search radar which operates outside the actual f1–f2 frequency is obtained.

In the second state B, which corresponds to the "camouflage" of the antenna wherein reflection occurs for all radar frequencies, the radome 2 is comprised of two passive networks 3, 4 and of the active network 5 that is controlled in state B. In that state, the antenna 1 obviously cannot transmit or receive, but it becomes "invisible" for any search, as a result of the reflectiveness of the radome 2 which scatters into space any search beam.

Figure 2:
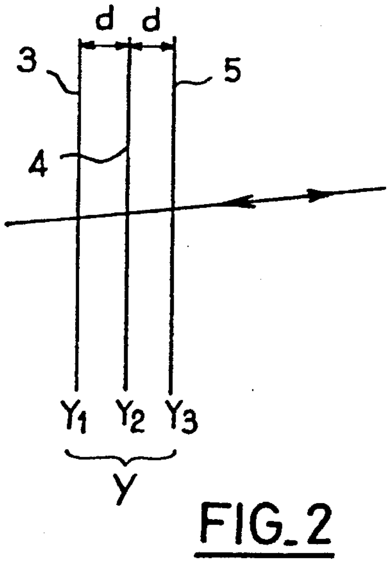
Figure 3:
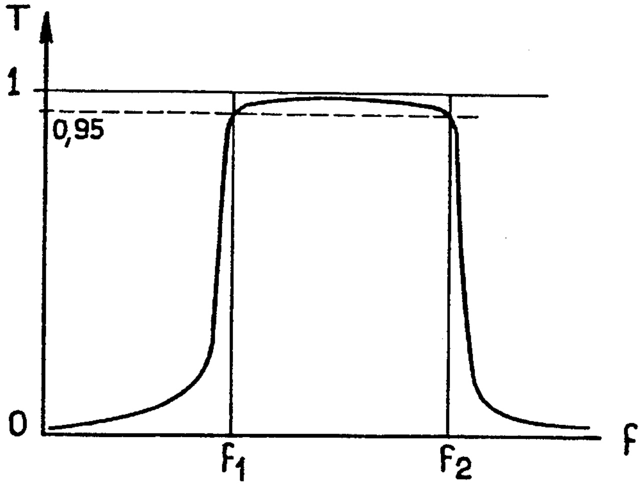

FIGS. 2 and 3 explain the general means for obtaining the effects that were described above.

In the schematized example of FIG. 1, the radome 2 is comprised of the superimposition of three networks 3, 4, 5, of which the first two 3, 4 are assumed to be passive and the third 5 which is active. These networks are superimposed one behind the other at a distance d which is appropriately selected and preferably lower than or equal to $\lambda/2$, $\lambda$ being the average wave length of the hyperfrequency waves in the targeted f1–f2 work band of the antenna. In an implementation example which has been satisfactory, the networks 3, 4, 5 were placed one behind the other at a distance of 5.8 millimeters, or roughly equal to $\lambda/6$ for an average frequency of 9,000 MHZ (Z frequency band). The panels are being maintained one behind the other at a distance, for instance, with an intermediate beehive support structure made of plastic according to a conventional shaping technique of multi-layer antennas and radomes.

The passive networks 3 and 4 are appropriately comprised, for instance with metal grids with adequate perforations, so that those networks display the desired hyperfrequency characteristics. A practical make-up example of such grids will be provided later with respect to FIG. 5. At the considered operating frequency of the antenna, the networks which are formed by the perforated grids 3 and 4 display set susceptances Y1, Y2, a susceptance being the reciprocal of that which measures the impedance.

According to the invention, the characteristics of the third active network 5 is determined so that, when strong current runs therethrough for instance intensities equal to about 20 milliamps, an impedance Y3 of the network is obtained, such that the susceptance Y which equals three coupled networks Y1, Y2, Y3, roughly equal to zero. The fact that this characteristic is reached can be determined through calculations, with diagrams or experimentally. The ratio is only verified in the narrow selected frequency band f1–f2. Outside of the frequency band, the panel susceptance increased very rapidly, the panel therefore being reflective.

This is illustrated by FIG. 3 where the composite panel is shown as a function having its frequency represented along the abscissa and its transmission T coefficient represented along the ordinate. For a f1–f2 frequency band, the transmission coefficient can be seen to be greater than 0.95; in other words, for that frequency band, at least 95% of the energy that is transmitted or received crosses the radome without significant distortion, and this is valid regardless of the direction of the poling plane of the electrical field E of the transmitted or received wave, in view of the specific structure of the networks that operate symmetrically in all directions as explained later on in relation to FIG. 5.

Outside of the frequency band f1–f2, the transmission coefficient suddenly decreases, the panel comprising an effective band-pass filter. Usually, the selection window will be even more accurate (or the band-pass filter will be even more accurate) when at least two passive networks 3, 4 and an active network 5 are planned, even though under some conditions, a simplified structure with a single passive network and a single active network can be satisfactory.

Also, if the network 5 is controlled in state B, a state in which no current crosses through the loaded diode wires, the susceptance of that network reaches infinity, leading to any hyperfrequency beam received on the panel 5 being reflected.

Figure 4:
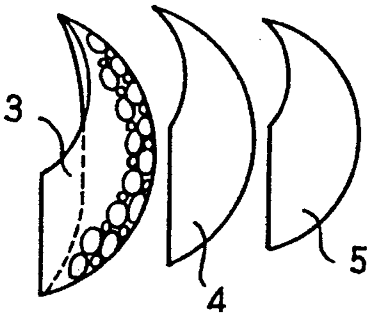

For the reflection to take place under scattering conditions that were made explicit above, the panel comprised of superimposed networks is shaped so as to give it an outward convex curvature, as schematized in FIG. 4, the antenna 1 being protected inside the concavity of the panel. A possible concrete implementation mode of the panel will be described, with reference to FIG. 5.

Figure 5:
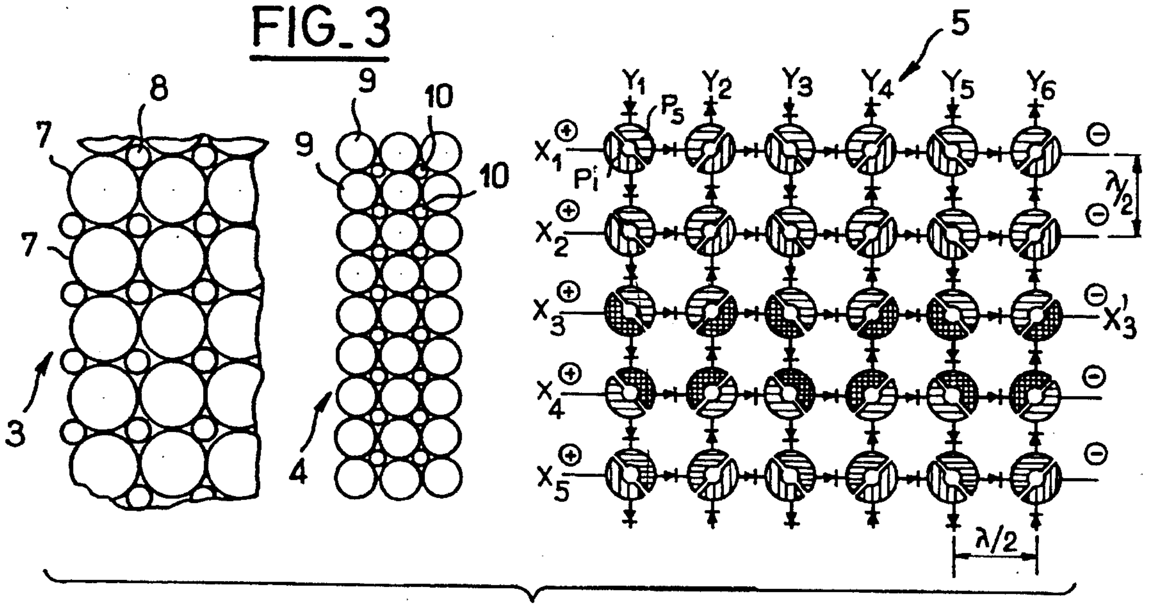

According to the implementation mode illustrated in figure 5, the passive network 3 is comprised of a grid which is made of metal conductive circles 7 that are interconnected. The width of the metal conductors is about 0.5 mm and the diameter of those circles is about 13 mm. Between the circles 7, smaller circles 8 are formed, and the entire grid can be produced according to any conventional method, for instance by swaging and shaping of a metal sheet of appropriate thickness.

The network 4 of the second layer is made like network 3, except that the circles 9 and 10 of the grid have diameters which are more or less half of those of the respective circles 7 and 8 of grid 3.

The third active network 5 is made of two sub-networks of associated wires loaded with diodes (or diode wires) which are respectively directed according to an overall direction X and according to the overall orthogonal direction.

Practically speaking, the active network can be made into a single side of a support plate made of plastic of an appropriate grade, for instance beehive which also is interpolated with a thickness d between two adjacent networks (support plate not shown), for instance according to the printed circuit method, a square mesh grid with a side of $\lambda/2$ ($\lambda$ being the average length of the electromagnetic wave of the considered operating frequency f1–f2 band). Each knot in the grid is occupied by a conductive metal plate which is usually shaped like an annular pellet. Each pellet is subdivided into two half-pellets which are referred to respectively as $P_S$ (upper plate with horizontal stripes) and $P_i$ (lower plate with vertical stripes) that are electrically separated one from the other by an interval or a gap.

From those plates, it is possible to achieve the electrical supply of all the wire segments which gather each adjacent plate two by two, on a single side of a support plate, so that by supplying the network 5 with one of its segments (to the left on the figure), as shown by signs +, and by collecting the supply on the other segment (to the right on the figure) as shown with signs –, it is possible to supply each segment of gridded mesh which is loaded with a diode. On the figure, in order to better follow its itinerary, a continuous current path according to line X3, X3', is spotted in order to better follow its itinerary.

With such an assembly, it seems:

a) that when the network 5 is supplied with strong current, for instance intensities of about 20 milliamps, the susceptance of that network takes on a finite value, for instance equal to about 1, while all of the three networks 3, 4, 5 which are placed one behind the other at the appropriate distance d, for instance 5.8 millimeters, display a global susceptance close to zero for the considered f1–f2 frequency window; in other words, under those circumstances, the radome panel is transparent with respect to the hyperfrequency waves that cross it at the considered frequency, for instance about 9,300 MHZ;

b) that, when the network 5 is not supplied with electrical current, such a network behaves like a perfectly reflecting surface with respect to a beam of hyperfrequency waves with a considered wave length λ; in other words inside the range of the considered f1–f2 frequency range, any wave which is received on the panel is reflected by the network 5 with a reflectivity that is sharply greater than 99%;

c) that outside of the f1–f2 frequency band of the window, even when the network 5 is crossed by strong currents, the susceptance of the panel which is made of all three networks is significant, and the entire panel is reflective under those circumstances.

As an example, a network 5 which is suited for the considered frequency band of 9,300 MHZ was built. The network displays a mesh width of λ/2 which is close to 1.7 cm. The diodes that are used are of the PIN 5082-3080 type which displays an overall capacity of 0.21 of at least equal to 50 volts and a breakdown voltage which is greater than 350 volts for a current of 10 microamps.

From the description of FIG. 5, it appears that, in view of the disposition of each network (3, 4, 5), those networks are insensitive to the direction in the area of the poling plane of the electrical field vector E of hyperfrequency waves which are transmitted or received. Subsequently, the invention operates regardless of the poling direction of the hyperfrequency waves.

We claim:

1. A method of preventing a radar from being sensed and of protecting the radar against disturbances caused by jammers, the jammers operating at frequencies outside the operational frequency band of the radar, the method comprising:

placing in front of the radar a radome having an active temporal space filter, the space filter including at least two hyperfrequency networks, at least one of the hyperfrequency networks being active and capable of taking on distinctive first and second states;

setting the active network to the first state when the filter is to be roughly transparent for the operational frequency band and roughly reflective outside the operational frequency band of the radar; and setting the active network to the second state when the filter is to be roughly reflective for all radar frequencies.

2. The method according to claim 1, further comprising:

superposing at least two passive networks with the active network.

3. The method according to claim 2, wherein the superposing step comprises:

placing the networks at a distance d one behind the other, d being smaller than or equal to λ/2, λ being the average wavelength of the radar operational frequency band.

4. An apparatus for preventing a radar from being sensed and for protecting the radar against jammers operating at frequencies outside the operational frequency band of the radar, the apparatus comprising:

a radome positioned in front of the radar, the radome including:

an active temporal space filter having at least two hyperfrequency networks, at least one of the networks being active and capable of taking on distinctive first and second states;

wherein, when the active network is set to the first state, the filter is roughly transparent for the operational frequency band of the radar and roughly reflective outside the operational frequency band; and wherein, when the active network is set to the second state, the filter is roughly reflective for all radar frequencies.

5. The apparatus according to claim 4, further comprising:

at least two passive networks superposed to the active network.

6. The apparatus according to claim 4, further comprising:

at least two passive networks superposed in parallel to the active network, the networks being positioned at a distance d one behind the other, d being smaller than or equal to λ/2, λ being the average wavelength of the operational frequency band of the radar.

7. The apparatus according to claim 4, wherein the active network comprises:

two subnetworks of rows of conductive wires, the rows being roughly parallel and locally directed to an overall direction, the wires being interrupted from place to place by adjustable variable resistor elements;

wherein the active network inside the radar operational frequency band is roughly reflective when currents which cross the wires roughly equal zero; and wherein the active network inside the radar operational frequency band is transparent when the currents are significant.

8. The apparatus according to claim 7, further comprising:

a network of gridded meshes formed from a subnetwork of diode wires that are locally directed according to the overall direction and an equivalent subnetwork of diode wires that are locally directed according to a direction roughly orthogonal to the overall direction.

9. The apparatus according to either claim 7 or claim 8, wherein the subnetworks of wires comprise a pitch approximately equal to λ/2, λ being the average wavelength of the operational hyperfrequency beam of the radar.

10. The apparatus according to either claim 7 or 8, wherein the active network comprises:

a plurality of diode-bearing wires connected by knots to form a gridded mesh, each knot having two separate conductive plates, each of the conductive plates gathering two segments of wires which lead to that knot.

11. The apparatus according to claim 10, wherein the conductive plates are in the form of ring-shaped pellets, each plate being separated into two symmetrical halves with a reduced surface so as to preserve a general perforated grid look.

12. The apparatus according to claim 5, wherein the passive networks comprise:

perforated grids made from metal conductive circles, the circles having narrow widths and diameters smaller than the average wavelength of the operational frequency band.

13. The apparatus according to claim 4, wherein the networks are shaped so as to surround the protected radar.

14. The apparatus according to claim 13, wherein the networks have convex shapes; and wherein the protected radar is positioned toward the middle of the concavity of the radome.

15. The apparatus according to claim 13, wherein the networks are spherically shaped; and wherein the protected radar is positioned toward the middle of the concavity of the radome.

16. The apparatus according to claim 13, wherein the networks have ogival shapes; and wherein the protective radar is positioned toward the middle of the concavity of the radome.

* * * * *